United States Patent [19]
> Sayigh et al.

[11] 3,734,844
[45] May 22, 1973

[54] NOVEL COMPOUNDS AND PROCESS

[75] Inventors: Adnan A. R. Sayigh; Fred A. Stuber, both of North Haven, Henri Ulrich, Northford, all of Conn.

[73] Assignee: The Upjohn Company, Kalamazoo, Mich.

[22] Filed: Sept. 25, 1972

[21] Appl. No.: 291,754

Related U.S. Application Data

[60] Division of Ser. No. 93,445, Nov. 27, 1970, Pat. No. 3,669,080, which is a continuation-in-part of Ser. No. 39,178, May 20, 1970, abandoned.

[52] U.S. Cl. ..................204/159.14, 96/35.1, 96/88, 117/93.31, 117/138.8, 260/47 CZ, 260/49, 260/78.5 T
[51] Int. Cl. .........................C08f 27/00, C08f 47/12
[58] Field of Search..............................204/159.14; 260/78.5 T

[56] References Cited

UNITED STATES PATENTS

| | | | |
|---|---|---|---|
| 3,669,825 | 6/1972 | Hall | 161/188 |
| 3,694,384 | 9/1972 | Azami et al. | 260/2 A X |
| 2,948,610 | 8/1960 | Merril et al. | 96/33 |

*Primary Examiner*—Joseph L. Schofer
*Assistant Examiner*—John Kight, III
*Attorney*—Denis A. Firth and John Kekich

[57] ABSTRACT

Radiation (thermal and light) sensitive polymers are provided and are characterized by (1) a recurring unit of the formula:

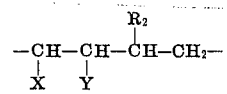

wherein $R_2$ is lower-alkoxy or phenyl, one of X and Y is —COOR and the other is —COR$_1$, R is an azidosulfonylcarbanilyloxy alkylene group and R$_1$ is —O—dye, —NH—dye or hydroxyarylamino, or (2) a combination in the same polymer chain of recurring units having the formulas:

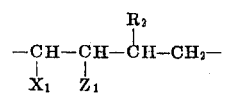

wherein one of $X_1$ and $Z_1$ represents —COOH and the other represents —COOR as defined above, and

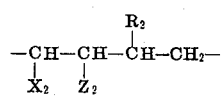

wherein one of $X_2$ and $Z_2$ represents —COOH and the other represents —COR$_1$ as defined above. The polymers can be chemically bonded to substrates, such as those containing C — H bonds only (e.g., polyolefins), which are not normally dye receptive. The bonding is effected by exposure to appropriate radiation; the exposure can be carried out imagewise to produce an appropriate image on the substrate. Accordingly, the polymers of the invention find use in the photoresist, printing and like arts.

6 Claims, No Drawings

NOVEL COMPOUNDS AND PROCESS

CROSS-REFERENCE TO RELATED APPLICATIONS

This application is a division of copending application Ser. No. 93,445, filed Nov. 27, 1970, now U.S. Pat. No. 3,699,080 which latter is a continuation-in-part of our application Ser. No. 39,178, filed May 20, 1970, and now abandoned.

BACKGROUND OF THE INVENTION

1. Field of the Invention

This invention relates to novel radiation-sensitive polymers and is more particularly concerned with radiation-sensitive polymers having attached to the chain thereof both dyestuff moieties and azidosulfonylcarbanilylalkoxycarbonyl moieties; and with the bonding of said polymers to substrates.

2. Description of the Prior Art

So far as is known, the polymers of the invention are novel and are not analogous to any polymers hitherto known in the art. The use of the polymers of the invention in bonding of dyes to substrates is also believed to be novel and not analogous to processes hitherto known in the art.

SUMMARY OF THE INVENTION

The present invention comprises a radiation-sensitive polymer characterized by the presence of recurring units selected from the class consisting of a. a recurring unit of the formula:

wherein $R_2$ is selected from the group consisting of lower-alkoxy and phenyl, one of X and Y is —COOR and the other —COR$_1$, R is a group of the formula:

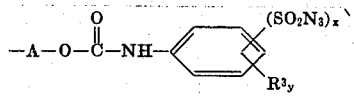

wherein A is alkylene having from two to six carbon atoms separating the valencies and a total carbon atom content of from 2 to 10, $R^3$ is selected from the class consisting of lower-alkyl and halogen, $x$ is an integer from 1 to 2, $y$ is an integer from 0 to 2, provided that $x + y$ is not greater than 3, and the $SO_2N_3$ group is in any of positions 3, 4, and 5 in the phenyl nucleus to which it is attached, and at least one of the said positions 3, 4, and 5 is unsubstituted; and $R_1$ is selected from the class consisting of the residue obtained by removing the hydrogen atom from the hydroxyl group of a dyestuff having a primary hydroxyl group, the residue obtained by removing the hydrogen atom from the amino group of a primary amino-containing dyestuff, and the residue obtained by removing a hydrogen atom from the amino group of an azo coupler;

and b. a combination in the same polymer chain of recurring units having the formulas:

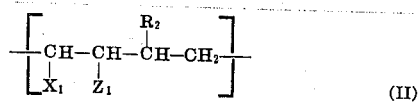

wherein one of $X_1$ and $Z_1$ is —COOH and the other is —COOR as defined above and

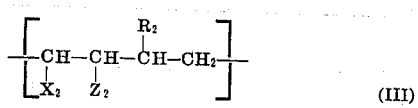

wherein one of $X_2$ and $Z_2$ is —COOH and the other is —COR$_1$ as defined above, and wherein $R_2$ in each instance has the meaning defined above.

The invention also comprises a process for chemically bonding a dyestuff to a substrate which process comprises applying a radiation-sensitive polymer, as defined above, to the substrate and exposing the treated substrate to radiation which activates the radiation-sensitive polymer and effects bonding between the radiation-sensitive polymer and the substrate.

The term "alkylene having two to six carbon atoms separating the valencies and a total carbon atom content from two to 10" means a divalent aliphatic hydrocarbon radical having the stated carbon atom content in the chain separating the valencies and overall. Illustrative of such radicals are ethylene, 1,2-propylene, 1,3-propylene, 1,4-butylene, 1,2-pentylene, 1,3-hexylene, 2,2-dimethyl-1,3-propylene, 2-methyl-1,4-butylene, 3-methyl-1,2-pentylene, 2-ethyl-1,2-octylene and the like.

The term "lower-alkyl" means alkyl from one to six carbon atoms, inclusive, such as methyl, ethyl, propyl, butyl, pentyl, hexyl, and isomeric forms thereof. The term "lower-alkoxy" means alkoxy from one to six carbon atoms, inclusive, such as methoxy, ethoxy, propoxy, butoxy, pentyloxy, hexyloxy, and isomeric forms thereof. The term "halogen" is employed in its usually accepted sense as being inclusive of fluorine, chlorine, bromine, and iodine.

The term "radiation-sensitive" is used herein to indicate that the polymers of the invention can be activated and undergo molecular modification on exposure to thermal and/or actinic radiation.

The term "azo coupler" is used in its conventionally accepted sense in the dyestuff art as meaning an aminophenol to which a diazonium compound will couple to form a dyestuff; see Encyclopedia of Chemical Technology, Ed. Kirk-Othmer, Second Edition, 1963, Vol. 2, page 870 et seq. Illustrative of azo couplers are p-aminophenol, 2-amino-1-naphthol, 4-amino-1-naphthol, 5-amino-1-naphthol and the like.

DETAILED DESCRIPTION OF THE INVENTION

The radiation-sensitive polymers of the invention are characterized in that they are derived from a polymer having the recurring anhydride-containing unit:

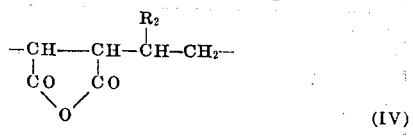

wherein $R_2$ is as hereinbefore defined, by modifying two or more of said anhydride-containing moieties to form recurring units of formulas (I), (II), or (III). When the radiation-sensitive polymer of the invention contains two or more of the units having the formula (I), it is not necessary that it also contain any recurring units of formula (II) or (III), although it can do so. However, where the radiation-sensitive polymer of the invention does not contain any recurring units of formula (I) said polymer contains a combination of recurring units of both formula (II) and formula (III). The distribution of said recurring units of formulas (I), (II), and (III) and of any unchanged units of formula (IV), in the polymer chain of the polymers of the invention is entirely random as will be apparent from the various methods of preparation of the polymers which will be described below.

The polymers having the recurring unit (IV), which are employed as starting materials in preparing the radiation-sensitive polymers of the invention, are well-known in the art and are copolymers of maleic anhydride with styrene or the appropriate lower-alkyl vinyl ether. In preparing the radiation-sensitive polymers of the invention in which there is a combination of recurring units (II) and (III) in the polymer chain, the preferred method comprises reacting the starting polymer with a mixture of the appropriate alcohol R—OH, wherein R is as hereinbefore defined, and the appropriate amino or hydroxy-containing dyestuff or azo coupler $R_1H$, wherein $R_1$ is as hereinbefore defined. The reaction is carried out in the presence of a tertiary base and, advantageously, in the presence of an inert organic solvent. Examples of tertiary bases which can be used, and which are generally present in the reaction mixture in an amount corresponding to at least 10 percent by weight of the starting copolymer are pyridine, N,N-dimethylaniline, triethylamine, N-morpholine, N-methyl piperidine and the like. Pyridine is the preferred tertiary base and can, if desired, be used in sufficient amount to act as solvent as well as catalyst for the reaction. Indeed, in a most preferred embodiment of the invention, the reaction is carried out with both reactants in solution in pyridine.

However, in place of the excess of pyridine as solvent, there may be used an inert organic solvent, i.e., an organic solvent which does not enter into reaction with either reactant or interfere in any way with the desired course of the reaction. Examples of inert organic solvents are benzene, toluene, xylene, tetrahydrofuran, dioxane and the like.

The reaction of the starting copolymer with the mixture of alcohol ROH and amino- or hydroxy-containing dyestuff or azo coupler $R_1H$, is advantageously carried out at elevated temperatures, i.e., from about 50°C to about 150°C, in order to achieve a suitable rate of reaction. The course of the reaction can be followed by routine procedures, for example, by infrared spectroscopic examination of aliquots. The desired radiation-sensitive polymer so obtained can be isolated from the reaction product by standard procedures. Thus, the desired product is generally present in the reaction product in the form of its salt formed by the tertiary amine catalyst with the free carboxy groups generated in the reaction. Thus, the two reactions, taking place at different locations in the molecule of the starting copolymer, can be represented schematically as follows:

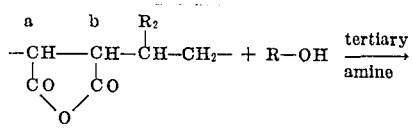

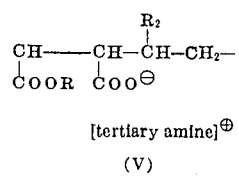

(IV)                (V)

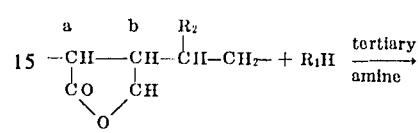

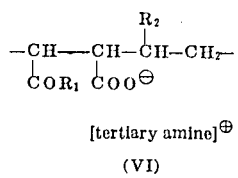

(IV)                (VI)

wherein R, $R_1$, and $R_2$ are as hereinbefore defined.

For the sake of simplicity the reaction schemes shown above illustrate the opening of the anhydride ring in the starting copolymer in each case so that the carbon atom $a$ carries the moiety —COOR or —$COR_1$, wherein R and $R_1$ have the significance hereinbefore defined, and the carbon atom $b$ carries the carboxylic acid salt moiety. As will be readily appreciated by one skilled in the art, the anhydride moiety in the starting polymer can open in the reverse manner so that the corresponding unit in the final product, in one or both of the cases, has the moiety —COOR or —$COR_1$ on the carbon atom $b$ and the carboxylic acid salt moiety on the carbon atom $a$. It will be further appreciated by one skilled in the art that the product obtained by the above reaction will have a largely random distribution of the two possible structures in the units in the chain of the final product. It is to be understood that the specification and claims of this application are not limited to polymers having only one of the two possible structures in the recurring unit but are intended to encompass all possible combinations of structures within the polymer chain.

The radiation-sensitive polymer of the invention is accordingly recovered from the reaction product by acidifying the latter and, in the case where no inert solvent was present, isolating the precipitated polymer by filtration or like means. Where an inert solvent has been employed in the reaction, the desired polymer is isolated from the solvent solution by precipitation with a solvent such as carbon tetrachloride in which the polymer is insoluble or by evaporation of the solvent in question.

As will be appreciated by one skilled in the art, the number of anhydride moieties in the starting copolymer which will be converted in the manner described above will depend on the total amounts and relative proportions of the copolymer and the two monomeric reactants employed in the above reaction. Advantageously, the relative amounts of alcohol ROH and dyestuff or azo coupler $R_1H$ employed in the above reaction are such that there are from about 0.2 moles to about 5 moles of ROH for each mole of $R_1H$, i.e., the radiation-sensitive polymer will contain from about 5 to about 0.2 of the recurring units of formula (III) for each recurring unit of formula (II). Preferably the proportions of ROH to $R_1H$ in the above reaction are about 1 mole of the latter for each mole of the former so that, for every recurring unit of formula (II) in the final polymer, there is one recurring unit of formula (III).

Further, the relative molar proportion of starting polymer to the reactants ROH and $R_1H$ is advantageously such that from about 20 percent to about 100 percent of the anhydride moieties present in the initial polymer are converted to moieties of the formulas (II) or (III). Preferably the relative molar proportions of the reactants are such that about 80 percent of the anhydride moieties present in the initial polymer are converted to moieties of the formulas (II) or (III).

An alternative but less preferred method of preparing the radiation-sensitive polymers of the invention in which there is a combination of recurring units (II) and (III) in the polymer chain comprises carrying out the above reaction between the starting polymer and the reactants ROH and $R_1H$ stepwise instead of simultaneously. Thus, using the reaction conditions described above, the starting copolymer is reacted firstly with one of the reactants ROH and $R_1H$ and the product so obtained is reacted with the other of said reactants. The order in which the two reactants are employed is not critical.

Whichever of the two methods is employed in preparing the radiation-sensitive polymers of the above type, it is obvious that the distribution of the various units of formula (II) and (III) in the polymer chain will be largely random and not controlled.

The radiation-sensitive polymers of the invention which contain a recurring unit of formula (I) are prepared by a modification and extension of the above-described two step procedure. Thus, the starting copolymer is reacted with one of the two reactants ROH or $R_1H$ under the reaction conditions described above whereby, depending on the relative proportion of reactants, one or more of the anhydride moieties in the starting copolymer is converted to the tertiary amine salt of the corresponding half-ester or amide of formula (V) or (VI). The free carboxylic acid is then generated from the amine salt and said acid is then esterified or amidated, as the case may be, with whichever of the reactants ROH or $R_1H$ was not used in the first step. Said esterification or amidation can be carried out in accordance with procedures well-known in the art. Illustratively, in the case of esterification, the alcohol and the acid are brought together at elevated temperatures, i.e. from about 50°C to about 150°C, in the presence of a trace of mineral acid such as sulfuric acid, hydrochloric acid and the like and, advantageously, in the presence of an inert organic solvent as hereinbefore defined. Preferably, the inert organic solvent is a solvent such as benzene which forms an azeotrope with water and can thereby be used to remove the water eliminated in the esterification reaction and so accelerate the rate of the latter. In the case of amidation, the free carboxylic acid moieties in the intermediate polymer are converted to the corresponding acid chloride by reaction with thionyl chloride and the like, and the acid chloride is reacted with the appropriate amino dyestuff or aminophenol under conditions generally employed in the preparation of amides.

However, when the desired recurring unit of formula (I) contains an amide group, said group is preferably introduced in the first of the two steps by opening the anhydride ring of the starting copolymer by reaction with the appropriate aminodyestuff or aminophenol. The second stage of reaction would then always be esterification.

Just as in the case of the polymers of the invention having the recurring units of formulas (II) and (III), so in the case of the polymer having the recurring unit (I), the latter unit can exist in two structures depending upon the manner in which the anhydride ring in the unit (IV) of the starting copolymer opens. The product obtained by the process described above will have a polymer chain in which some recurring units have one structure and some have the other. For the sake of convenience this state of affairs is summarized by use of the single formula (I) for the recurring unit of said polymer. It is to be understood that all the various possible structures are within the scope of this invention.

As will be appreciated by one skilled in the art, the percentage of anhydride moieties in the starting copolymer which are converted to moieties of the formula (I) in the above-described preparation, can be controlled by using the appropriate molar proportions of reactants. Further, it is possible to obtain radiation-sensitive polymers of the invention which contain a mixture of recurring units of formula (I) and formula (II) or (III) or even a mixture of all three types, by employing an amount of esterifying or amidating agent in the final step, which is less than the stoichiometric amount required to convert all the free carboxy groups in the intermediate polymer. The radiation-sensitive polymers of the invention having a combination of all three recurring moieties of formulas (I), (II), and (III) in polymer chain can be obtained by subjecting to amidation or esterification some, but not all, the free carboxy moieties in the radiation-sensitive polymers of the invention prepared as described above which have recurring units of both formula (II) and formula (III) in the chain thereof.

The amino dyestuffs represented by the formula $R_1H$, wherein $R_1$ is as above defined, can be any of the basic dyestuffs, listed in Color Index, Second Edition, Vol. 1, pages 1617–1653, 1965, published jointly by The Society of Dyers and Colorists, Bradford, Yorkshire, England, and The American Association of Textile Chemists and Colorists, Lowell, Mass., which dyestuffs contain an amino group but have no other group such as hydroxy or amino in the molecule, which would enter into reaction with the anhydride moiety of the starting polymer. Typical of said dyestuffs are: crystal violet, methylene blue, malachite green, auramine 0, basic fuchsin, Aniline Yellow, Disperse Orange 3, Disperse Black 7, Disperse Red 13, Disperse Red 9, Vat Red 33, Mordant Violet 6, Phenylene blue, Disperse Orange 11, Natural Orange 6, Natural Brown 7, and Natural Yellow 12.

The primary hydroxy group containing dyestuffs represented by the formula $R_1H$, wherein $R_1$ is as above defined, can be any of those dyestuffs well-known in the art which contain a single primary hydroxy group but which contain no other active group such as hydroxyl, amino and the like, which would enter into reaction with the anhydride moiety of the starting polymer.

Illustrative of said dyestuffs containing primary hydroxyl groups are Natural Orange 6 (2-hydroxy-1,4-naphthoquinone), Natural Brown 7 (8-hydroxy-1,4-naphthoquinone), Natural Yellow 1,2[2-(p-hydroxyphenyl)-1,4-naphthoquinone]; the 2-hydroxyethyl ethers of said compounds (obtained by reacting the hydroxy dyestuffs such as those named above with 1 molar proportion of ethylene oxide); Disperse Red 13, also known as Palacet Scarlet B [2-chloro-4-nitro-4'-(N-ethyl-N-hydroxyethylamino)azobenzene] and like compounds obtained by reacting basic dyestuffs containing a secondary amino group (see Color Index, supra) with 1 molar proportion of ethylene oxide.

Those radiation-sensitive polymers of the invention having a recurring unit of formula (I) or formula (III), or a combination thereof, in which the group $R_1$ represents the residue of an aminophenol azo coupler, can be reacted with a diazonium salt to convert said group $R_1$ to a dyestuff moiety. The conversion can be carried out either before, or after, the radiation-sensitive polymer is bonded to a substrate as will be described hereinafter.

The reaction of the azo complex moiety with the diazonium salt can be carried out using the procedures and diazonium salts discussed and exemplified in Encyclopedia of Chemical Technology, Ed. Kirk-Othmer, Second Edition, 1963, Vol. 2, page 870 et seq. Any of the Azoic Diazo Components listed in Color Index, supra, Vol. 2, page 2571 - 2612 can be used in the diazotization step.

The maleic anhydride copolymers having the recurring unit (IV) which are employed as starting materials in the process of the invention are well-known in the art; see, for example, Encyclopedia of Chemical Technology, supra, Vol. 8, pages 685 et seq. and Vol. 11, page 652; U.S. Pat. Nos. 2,424,814 and 2,047,398. These copolymers can be obtained in a wide range of molecular weight, namely, from about 100,000 to about 1,250,000. As will be appreciated by one skilled in the art, the chain length of the starting maleic anhydride copolymer will remain unaffected by the conversion to the ester and amide polymer having recurring unit (I), (II), or (III) although the overall molecular weight of the polymer will increase according to the number of anhydride moieties in the starting copolymer which are converted to ester and amide moieties.

In general the molecular weight of the radiation-sensitive polymers of the invention will be within the range of about 100,000 to about 2,000,000. Said polymers are, for the most part, resinous solids which are soluble in polar solvents such as acetone, methyl ethyl ketone, tetrahydrofuran, dioxane and the like, from which they can be cast as films as will be described in more detail hereinafter.

The radiation-sensitive polymers of the invention having the recurring units (II) and (III) can, by virtue of the free carboxylic acid groups therein, exist in the form of salts such as the salts with alkali metals such as sodium, potassium, lithium and the like, alkaline earth metals such as calcium, strontium, barium and the like, ammonia and organic amines. These salts are, in general, possessed of reasonable solubility in water a property which renders them valuable in certain applications of the polymers of the invention as is discussed below. The free carboxylic acid moieties of the polymers of the invention having the recurring units (II) and (III) can be converted to the corresponding salts by procedures well-recognized in the art; for example by reacting the polymer in solution in a polar solvent with an aqueous solution of the corresponding base. The amount of base employed can be such as to neutralize only one, or more than one, or all, of the free carboxylic acid groups in the polymer chain.

The alcohols R—OH, wherein R is as hereinbefore defined, which are employed as starting materials in preparing the radiation-sensitive polymers of the invention, are readily prepared by reacting the appropriate diol HO—A—OH, wherein A has the significance hereinbefore defined, with the appropriate isocyanatobenzenesulfonyl chloride of formula:

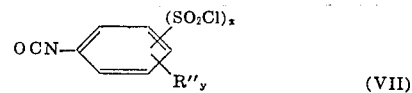

(VII)

wherein $R''$, $x$ and $y$ have the significance hereinbefore defined. There is thus obtained the corresponding sulfonylchloride intermediate having the formula:

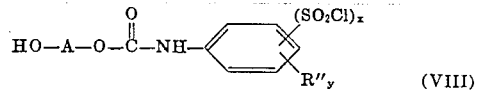

(VIII)

which intermediate is then reacted with sodium azide to convert the sulfonylchloride moiety to sulfonylazide and yield the desired alcohol ROH.

In carrying out the above synthesis of the starting alcohol ROH, the diol HO—A—OH and the isocyanatobenzenesulfonyl chloride (VII) are brought together under conditions well-known in the art for the reaction of alcohols and isocyanates. Advantageously, the reactants are brought together at ambient temperatures, i.e. of the order of 20° to 25°C, in the presence of an inert organic solvent, as hereinbefore defined. The reaction mixture is maintained below about 50°C, after the reactants have been brought together, in order to avoid reaction of the hydroxy groups in the diol with the sulfonyl halide moieties in the isocyanatosulfonyl chloride. Such reaction would clearly give rise to undesired byproducts.

If desired, the reaction between the diol and the isocyanatobenzenesulfonyl chloride (VII) can be carried out in the presence of a catalyst. Illustrative of such catalysts are those conventionally used in promoting the reaction between a hydroxyl group and an isocyanato group, such as, for example triethylamine, triethylenediamine, N,N,N',N'-tetramethylethylenediamine, N,N,N',N'-tetraethylethylenediamine, N-methylmorpholine, N-ethylmorpholine, 1,1,3,3-tetramethylguanidine, N,N,N',N'-tetramethyl-1,3-butanediamine, stannous octoate, dibutyltin dilaurate and the like.

The intermediate hydroxyalkyl carbamate (VIII) so prepared can, if desired, be isolated from the reaction mixture, for example, by evaporation of solvent, and purified, for example, by recrystallization, before conversion to the desired alcohol ROH. However, it is generally not necessary to isolate the compound (VII) prior to its conversion to the desired alcohol and, indeed, in most instances the reaction product obtained in the reaction of the diol and the isocyanatosulfonyl chloride (VII) can be employed without any further treatment in the conversion to the ultimate alcohol. Illustratively, the reaction product obtained in the above process, comprising the compound (VIII) in solution in inert organic solvent, is treated, without any purification, with the appropriate amount of sodium azide, i.e., one mole of sodium azide for each $SO_2Cl$ group in the compound (VIII). The reaction is exothermic and is controlled, by cooling as required, to maintain the reaction temperature in the range of about 25°C to about 80°C. Sodium chloride is eliminated in the reaction and precipitated from the reaction mixture thereby serving as a ready guide to the progress of the reaction. The desired alcohol ROH can be separated from the reaction mixture by conventional procedures. For example, the sodium chloride, which has precipitated, is separated by filtration and the filtrate is evaporated to dryness. The alcohol so isolated can be purified by recrystallization or like procedures prior to being employed in the synthesis of the polymers of the invention.

The isocyanatobenzenesulfonyl chlorides (VII) which are employed as starting materials in the preparation of the alcohols ROH are, for the most part, well-known in the art and are obtained by phosgenation of the corresponding known aminobenzenesulfonic acids using conventional procedures such as that described by Alberino et al. J. Polymer Science, Vol. 5, pages 3212-13, 1967.

As set forth previously, the novel radiation-sensitive polymers of the invention are useful for a variety of purposes. For example, said polymers can be used as a means of chemically bonding dyestuffs to the surface of a variety of substrates such as paper, cotton, and like cellulosic materials, metal, glass and the like, as well as polymeric substrates such as polyolefins, polyurethanes, polyamides, polyesters, polyacetals and the like, which are not normally receptive to such dyestuffs. In this particular use of the polymers of the invention, a coating of the latter is applied to a part, or the whole, of the surface of the substrate to be treated. The coating is applied advantageously by dissolving the radiation-sensitive polymer of the invention in a polar solvent, such as exemplified above, and spreading the solution on the substrate using the appropriate spreading means. The coated substrate is then exposed to an appropriate source of radiation either thermal or actinic, necessary to activate the polymer of the invention. A wide variety of sources of thermal and/or actinic radiation can be employed. Such sources include carbon arcs, mercury vapor lamps, fluorescent lamps, argon glow lamps, photographic flood lamps, and tungsten lamps. Preferably, the source of radiation is one which generates ultraviolet light of wavelength within the range of about 250 nm to about 390 nm.

If desired, the irradiation of the coated substrate can be performed "imagewise"; that is to say, a negative of an image to be produced on the surface of the substrate is interposed between the coated substrate and the source of radiation. The radiation-sensitive polymer in those portions of the coated substrate receiving the radiation is activated and becomes chemically bonded to the surface of the substrate. The chemical bonding of the radiation-sensitive polymer to the substrate is believed to take place by degradation of the sulfonazido group or groups in the moieties of said polymer to yield a nitrene radical which enters into interaction with —C—H bonds in the substrate. This suggested reaction mechanism is, however, offered by way of explanation only and is not intended in any way to define or limit the scope of the present invention.

Where the polymer, in the coated substrate obtained as described above, contains the residue of an azo coupler (i.e., the recurring units I or III contain $R_2$ as the residue of an aminophenol azo coupler) the coated substrate can then be treated with a diazonium salt solution to convert the azo complex residue to a dyestuff moiety. The application of the diazonium salt to the azo complex can be accomplished in any conventional manner, for example, by dipping the coated substrate in a bath of diazonium salt solution or applying the latter to the substrate using a roller, sponge or the like.

As will be readily appreciated by one skilled in the art, the above process, for chemically bonding basic dyestuffs to polymeric substrates not normally receptive to such dyes, can be adapted to a variety of dyeing and/or printing techniques. For example, the printing of advertising and like matter on polymer films can be accomplished readily on a continuous basis by passing a continuous sheet of said film successively through zones in which the film is coated with a radiation-sensitive polymer of the invention, the coated film is exposed imagewise to activating radiation from an appropriate source, and the unexposed coating is removed by solvent washing. The latter step can be accomplished by washing the exposed film with the solvent employed to accomplish the original coating or with a like polar solvent. Alternatively, where the light sensitive polymer contains free carboxy groups, the unchanged light sensitive polymer can be removed from the film by washing with an aqueous solution of a base such as sodium carbonate, sodium hydroxide, ammonium hydroxide and the like. In the case where the polymer of the coating contains an azo coupler in place of a dyestuff, a final step, of contacting the exposed coating with a diazonium solution, is added.

In yet another use of the novel radiation-sensitive polymers of the invention having the recurring unit (I), the latter are employed as the components of a photoresist system. For example, the said polymers can be used in the photographic reproduction and printing arts to produce printed masters as follows. The polymer (I) is dissolved in a polar organic solvent such as those exemplified above and cast as a film on an appropriate substrate such as paper, metal and the like film supports normally employed in the reproduction art. A negative of the image to be reproduced, e.g., lines, screened or half-tone negatives, or diapositives, is interposed between the supported film so obtained and a source capable of producing radiation necessary to activate the radiation-sensitive polymer. The polymer in those portions of the supported film exposed to the radiation is thereby bonded to the substrate. The polymer in the unexposed portions of the film can then be removed by washing with polar solvent, or, in the case of polymers containing free carboxy groups, by washing with an aqueous solution of a base as described above, leaving the exposed polymer bonded to the substrate in the form of a positive image corresponding to the negative used in the irradiation step. Said image has high resistance to solvents and mechanical stresses and can be used to advantage as a master from which to reproduce copies of the original.

In a similar manner photoresist systems produced from the radiation sensitive polymers of the invention can be used in other photoresist applications such as in the printing of microcircuitry and related applications which involve production of an image, in the form of bonded polymer, on a metal substrate such as copper, followed by removal, in part or in toto, of the uncoated metal by etching. Essentially the same technique as that described above in the production of printed masters is employed in the formation of the polymer image on the substrates.

The following preparations and examples describe the manner and process of making and using the invention and set forth the best mode contemplated by the inventors of carrying out the invention but are not to be construed as limiting.

PREPARATION 1

To 50.4 gms (0.8 mole) of ethylene glycol in 500 ml of acetonitrile is added a solution of 43.2 gms (0.2 mole) of 4-isocyanatobenzenesulfonyl chloride (prepared by the method of L. Alberino et al., supra). The addition is accomplished over a period of 10 minutes with stirring and cooling at circa 2° to 8°C, and the mixture is then allowed to stand at room temperature until the NCO band stretching has disappeared in the infrared spectrum of an aliquot of the reaction mixture (approximately 30 minutes). To the mixture so obtained is added 13 gms (0.2 mole) sodium azide and the resulting mixture is stirred for 1 hour at room temperature. The sodium chloride which has precipitated is removed by filtration and about 80 percent of solvent is evaporated from the filtrate under vacuum. Water is added to the remaining filtrate to precipitate the water insoluble product. The latter is separated by filtration, washed with water, and dried under vacuum at room temperature. There is thus obtained 52 gms (91 percent theoretical yield) of a white crystalline powder identified by infrared and NMR spectrometric examination as 2-hydroxyethyl 4-azidosulfonylcarbanilate and having a melting point of 115° to 118°C. Recrystallization from acetonitrile gave white crystals having a melting point of 120° to 122°C (Fisher-Johns method); 124°C (DSC method).

Analysis:
Calculated $C_9H_{10}N_4O_5S$: C= 37.76; H= 3.46
Found: C= 37.60; H= 3.73

Using the above procedure but replacing ethylene glycol by 1,3-propylene glycol, 1,4-butanediol, 1,3-pentanediol, 2,3-hexanediol, 1,5-heptanediol, and 2,2-dimethyl-1,6-hexanediol, 2,5-diethyl-1,6-hexanediol there are obtained:
3-hydroxypropyl,
4-hydroxybutyl,
3-hydroxypentyl,
3-hydroxy-2-methylpentyl,
5-hydroxyheptyl,
6-hydroxy-2,2-dimethylhexyl, and
6-hydroxy-2,5-diethylhexyl 4-azidosulfonylcarbanilate, respectively.

EXAMPLE 1

A mixture of 1.7 g of a poly(maleic anhydride co-methyl vinyl ether) [having an average molecular weight of 250,000: Gantrez AN-119], 1.57 g of Palacet Scarlet B, and 1.43 g of 2-hydroxyethyl 4-azidosulfonylcarbanilate was dissolved in 30 ml of anhydrous pyridine. The resulting solution was heated at 80°C for 12 hours. The product so obtained was evaporated to dryness and the residue was dissolved in a mixture of equal parts of acetone and water. The solution was acidified by the addition of 100 ml of 5 N hydrochloric acid. The solid which separated was isolated by filtration, dried, and dissolved in 50 ml of a mixture of acetone and methanol. There was thus obtained a solution containing a photosensitive modified poly(maleic anhydride co-methyl vinyl ether) in which 1 in 2 of the recurring units in the chain are moieties having the formula:

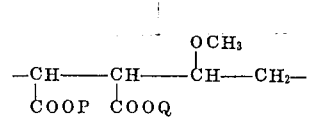

wherein one of P and Q is hydrogen and the other is

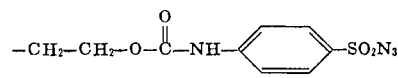

and 1 in 2 of the said recurring units are moieties of the formula:

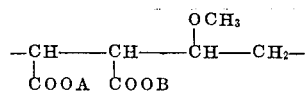

wherein one of A and B is hydrogen and the other is

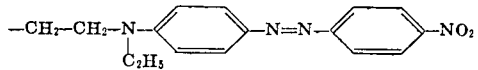

A film was cast by spraying a small sample of the above polymer solution on a polyethylene sheet using a whirler. The plate was irradiated by exposure for 5 minutes to a mercury arc lamp (Hanovia type SH). When the irradiation was complete, the film was found to be bonded to the polyethylene substrate and was highly resistant to removal by various abrasive forces and was insoluble in acetone and other polar solvents.

EXAMPLE 2

Using the procedure described in EXAMPLE 1 but replacing the poly(maleic anhydride co-methyl vinyl ether) there employed by a poly(maleic anhydride co-styrene) having an average molecular weight of 100,000, there was obtained the corresponding modified poly(maleic anhydride co-styrene) in which approximately 1 in 2 of the recurring units in the chain were moieties having the formula:

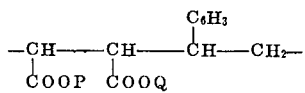

wherein one of P and Q is hydrogen and the other is

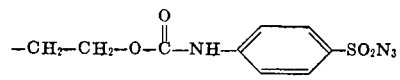

and 1 in 2 of the said recurring units were moieties of the formula:

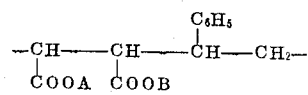

wherein one of A and B is hydrogen and the other is

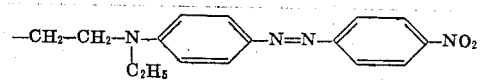

EXAMPLE 3

Using the procedure described in EXAMPLE 1 but replacing the 2-hydroxyethyl 4-azidosulfonylcarbanilate there used by equivalent amounts of 3-hydroxypropyl, 4-hydroxybutyl, 3-hydroxypentyl, 3-hydroxy-2-methylpentyl, 5-hydroxyheptyl, 6-hydroxy-2,2-dimethylhexyl, and 6-hydroxy-2,5-diethylhexyl 4-azidosulfonylcarbanilate, respectively, there are obtained the corresponding modified copolymers of maleic anhydride and methyl vinyl ether.

EXAMPLE 4

A film was cast from the solution of light sensitive modified copolymer of EXAMPLE 1, on polyethylene foil as substrate. On top of the film was placed a master representing a negative of a pattern of dots to be reproduced. The film was exposed for 2 minutes to the light emitted by a Hanovia type SH mercury arc, the plane of exposure being at a distance of 15 cm from the lamp. The exposed film was developed by immersion with agitation for one minute in a mixture of acetone and N,N-dimethylformamide (100:1 by volume). The image so obtained exhibited a high degree of resolution.

EXAMPLE 5

A mixture of 1.7 g of a poly(maleic anhydride co-methyl vinyl ether) [ having an average molecular weight of 250,000; Gantrez AN–119], 0.55 g of p-aminophenol, and 1.43 g of 2-hydroxyethyl 4-azidosulfonylcarbanilate was dissolved in 30 ml of anhydrous pyridine. The resulting solution was heated at 80°C for 12 hours. The product so obtained was evaporated to dryness and the residue was dissolved in a mixture of equal parts of acetone and water. The solution was acidified by the addition of 100 ml of 5 N hydrochloric acid. The solid which separated was isolated by filtration, dried, and dissolved in 50 ml of a mixture of acetone and methanol. There was thus obtained a solution containing a photosensitive modified poly(maleic anhydride co-methyl vinyl ether) in which 1 in 2 of the recurring units in the chain are moieties of the formula:

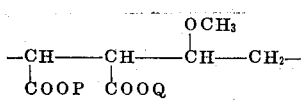

wherein one of P and Q is hydrogen and the other is

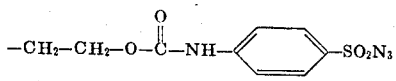

and 1 in 2 of the said recurring units have moieties of the formula:

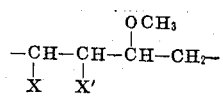

wherein one of X and X' is —COOH and the other is

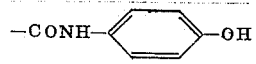

A film was cast on a polyethylene substrate from the solution so obtained. On top of the film was placed a master representing a negative of a pattern of dots to be reproduced. The film was exposed for 2 minutes to the light emitted by a Hanovia type SH mercury arc, the plane of exposure being at a distance of 15 cm from the lamp. The exposure film was developed by immersion with agitation for 1 minute in a mixture of acetone and N,N-dimethylformamide (100:1 by volume).

The exposed film was then immersed for a short period in a solution obtained by diazotizing a solution of 4.84 g (0.02 mole) of p-phenylazoaniline in 20 ml of 2N hydrochloric acid. The treated film was then washed with water and found to have a dark red image, corresponding to the negative employed in the irradiation, bonded thereon. The image was highly resistant to removal by abrasive forces and by solvents.

We claim:

1. A process for chemically bonding a dyestuff to a polymer which is not normally receptive to dyestuffs which process comprises
   a. applying to the said polymer a radiation-sensitive polymer characterized by the presence of recurring units selected from the class consisting of
   i. recurring units of the formula:

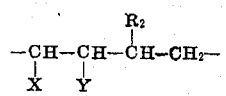

wherein $R_2$ is selected from the group consisting of lower-alkoxy and phenyl, one of X and Y represents —COOR and the other represents —COR$_1$ wherein R in each instance is a group of the formula:

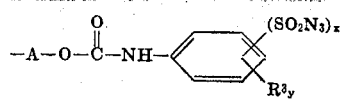

wherein A is alkylene having from two to six carbon atoms separating the valencies and a total carbon atom content of from 2 to 10, $R^3$ is selected from the class consisting of lower-alkyl and halogen, $x$ is an integer from 1 to 2, $y$ is an integer from 0 to 2, provided that $x + y$ is not greater than 3, and the $SO_2N_3$ group is in any of positions 3, 4 and 5 in the phenyl nucleus to which it is attached, and at least one of the said positions 3, 4, and 5 is unsubstituted; and $R_1$ in each instance is selected from the class consisting of the residue obtained by removing the hydrogen atom from the hydroxyl group of a dyestuff having a primary hydroxyl group, the residue obtained by removing the hydrogen atom from the amino group of an amino-containing dyestuff, and the residue obtained by removing a hydrogen atom from the amino group of an azo coupler;

ii. a combination in the same polymer chain of recurring units having the formulas:

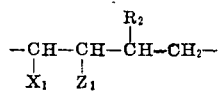

wherein one of $X_1$ and $Z_1$ represents —COOH and the other represents —COOR as defined above,

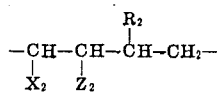

wherein one of $X_2$ and $Z_2$ represents —COOH and the other represents —$COR_1$ as defined above; and wherein $R_2$ in both instances has the significance defined above; and b. exposing the resulting combination of polymers to an appropriate source of actinic radiation sufficient to activate said light and heat-sensitive polymer.

2. The process of claim 1 wherein said radiation-sensitive polymer is characterized by a combination of recurring units having the formulas:

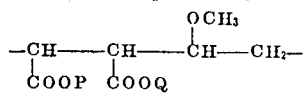

wherein one of P and Q is hydrogen and the other is

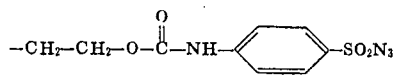

and

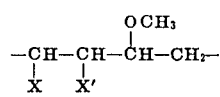

wherein one of X and X' is —COOH and the other is

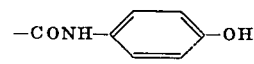

and the combination of polymers after irradiation is contacted with a diazonium salt solution.

3. The process of claim 1 wherein said radiation-sensitive polymer is characterized by a combination of recurring units having the formulas:

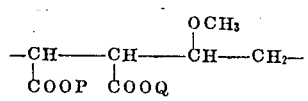

wherein one of P and Q is hydrogen and the other is

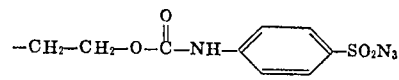

and

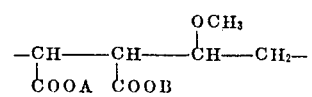

wherein one of A and B is hydrogen and the other is

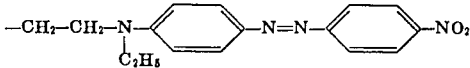

4. The process of claim 1 wherein the irradiation is carried out image-wise.

5. The process of claim 1 wherein the polymeric substrate is a polyolefin.

6. The process of claim 1 wherein the polyolefin is polyethylene.

* * * * *